United States Patent [19]
Carre

[11] 3,768,605
[45] Oct. 30, 1973

[54] DISC BRAKE WITH ANTI-VIBRATION ANCHORING ARRANGEMENT

[76] Inventor: Jean-Jacques Carre, 100 Avenue des Present Wilson, Montreuil/Bois, France

[22] Filed: May 4, 1972

[21] Appl. No.: 250,264

[30] Foreign Application Priority Data
May 26, 1971 France .............................. 7119081

[52] U.S. Cl. ............................................. 188/73.5
[51] Int. Cl. ............................................. F16d 65/00
[58] Field of Search ................ 188/72.4, 73.1, 73.3, 188/73.4, 73.5, 250 B

[56] References Cited
UNITED STATES PATENTS

| | | | |
|---|---|---|---|
| 3,368,647 | 2/1968 | Laverdant | 188/73.3 |
| 3,261,429 | 7/1966 | Burnett et al. | 188/73.3 X |
| 3,384,202 | 5/1968 | Swift | 188/73.3 |
| 3,556,265 | 1/1971 | Shakespear | 188/73.3 |
| 3,612,226 | 10/1971 | Pauwels et al. | 188/73.3 |
| 3,613,836 | 10/1971 | Dowell | 188/73.3 |

*Primary Examiner*—George E. A. Halvosa
*Attorney*—Ken C. Decker

[57] ABSTRACT

The invention relates to a disc brake and particularly to an anti-vibration anchoring arrangement for a brake pad in a disc brake. The brake pad is located in a U-shaped radial opening provided in the fixed support. The brake pad co-operates on one hand with two approximatively rectilinear abutments inside this opening and converging towards the outside of the latter, and on the other hand with a boss located at the bottom of said opening. When the brake is actuated, the brake pad is locked by three points by tilting in its plane around one of these points and the possibilities of vibrations are reduced.

1 Claim, 1 Drawing Figure

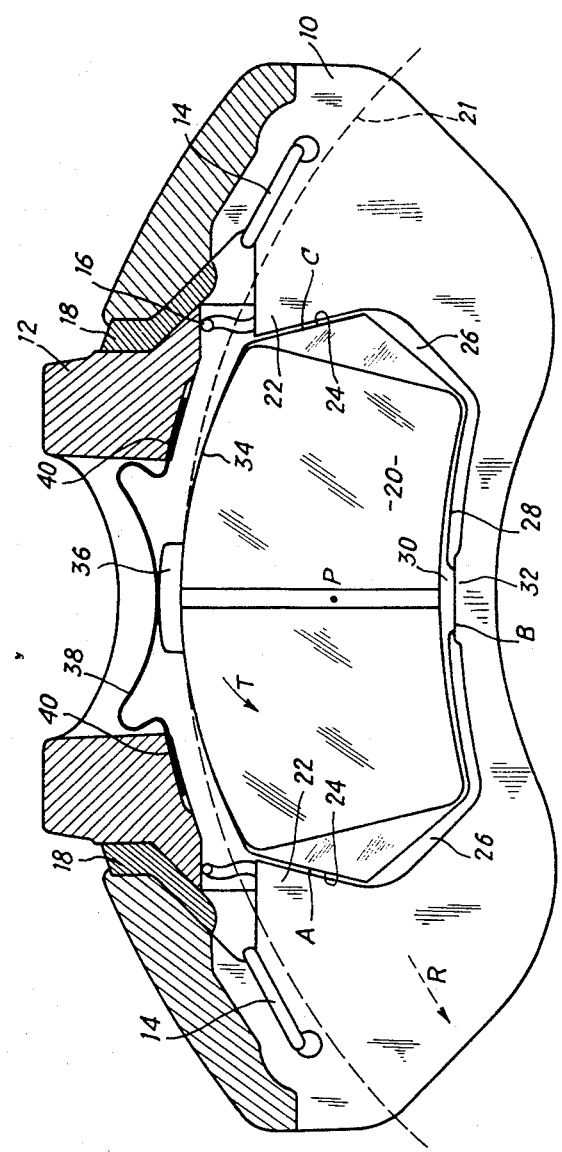

DISC BRAKE WITH ANTI-VIBRATION ANCHORING ARRANGEMENT

The invention relates to a disc brake and particularly to a new conception for anchoring the friction pads relatively to the fixed support permitting to avoid the vibrations of the pads, which are a source of disagreeable noises.

The subject of the invention is a disc brake wherein at least one friction pad takes anchorage by its edges on the approximatively radial sides of an opening provided in the fixed support, when said friction pad is applied against one face of the disc.

The brake is characterized in that said approximatively radial sides of the opening comprise approximatively rectilinear abutments inside the opening and converging towards the outside of the latter and in that the bottom of said opening and/or the base of the friction pad close to the axle of the disc comprise a radial boss permitting the pad to tilt in its plane.

It will be understood that with such a disposition, for a given sense of rotation of the disc, the front part of the pad is submitted to a wedge effect between the rectilinear abutment which co-operates with the front edge of the pad and the boss provided at the bottom of the opening which co-operates with the base of the pad close to the axle of the disc. In the same time, the friction pad slightly tilts around an axle parallel to the axle of rotation of the disc, and in the same sense of rotation, which makes the hinder part of the pad come in abutment against the corresponding abutment of the opening. The friction pad is then locked in the fixed support by three points : its front edge, its base and its hinder edge. Hence, the possibilities of vibrations are appreciably reduced with regard to what they were with a single abutment of the front edge against the corresponding side of the opening, from which resulted a vibration of the hinder part of the pad.

The invention will now be described by way of example with reference to the sole accompanying drawing, showing a cross view in a plane parallel to the disc, of a brake wherein the friction pad takes anchorage in the fixed support in accordance with the principles of the invention.

The brake represented in the FIGURE is of the kind described in the parent U.S. Pat. No. 3,368,647. It comprises a fixed support 10 including a radial opening receiving a sliding caliper 12 radially urged towards the outside by springs 14. Springs 14 abut on the base 16 of the caliper, said caliper being radially maintained by key elements 18, the dismounting of which permits the radial extraction towards the outside of caliper 12 when dismounting the brake.

A friction pad is arranged inside the radial opening provided in the fixed support 10, said pad being applied towards the disc 21 (shown in the FIGURE by a dotted line) by an hydraulic actuator and a re-action element (not represented) integral with the caliper 12.

It will be now described in detail the pad 20 and its co-operation with the sides of the opening provided in the fixed support 10.

The support 10 presents two abutments 22 directed towards the inner of the opening and constituting approximatively rectilinear surfaces, co-operating with corresponding surfaces 24 of the pad 20. As shown in the FIGURE, the interior part of the pad, i.e., the nearest part of the axle of the disc, is not entirely in engagement with the fixed support, and a free space 26 exists between this support and the pad, symmetrically with respect to the median line of the latter. The support plate of the pad presents, approximatively at the center of its base 28 close to the axle of the disc, a boss 30 co-operating with an approximatively rectilinear boss 32 of the fixed support, extending inside the opening. Another boss 36 is provided on the external peripheral edge 34 of the pad, radially directed towards the outside, whereon a leaf spring 38 is acting, for maintaining said pad 20 in abutment against said boss 32, hence making an anti-noise effect. The leaf spring 38 is anchored by its ends 40 on the base of the caliper 12.

It will be now described the behaviour of the pad 20 in the fixed support 10 when the disc is rotating in the sense of arrow R.

Due to the position of the co-operating surfaces of the abutment 22 and the pad 20, the braking torque is applied at a point A situated on the left side of the opening if considering the FIGURE. Point P represents in the FIGURE the thrusting center of the forces exerted by the means for tightening the caliper 12 on the pad 20. Said pad 20 tends to tilt in direction of arrow T, with respect to the point B of engagement of bosses 30 and 32. It results from this tilting a radial displacement towards the outside of the hinder end of pad 20 (on the right in the FIGURE), and a pressure exerted by the hinder edge 24 of pad 20 on the corresponding abutment 22 in point C. The wedge effect between central bosses 30 and 32 and the left abutment 22, and the thrusting on abutment 22 are such that the pad 20 is locked between the three points A, B and C, and that the vibrations are appreciably reduced, as shown by experience.

In the represented embodiment, the pad 20 is symmetrical with respect to a median radial axle. Obviously, it is possible to concept a pad wherein the edges co-operating with the abutments 22 do not present the same angle with the median radial axle of symmetry, and are determinated as a function of the desired effects for a preferential sense of rotation of the disc.

As well, calculation and experience may lead the constructor to dispose the boss 30 and the corresponding surface 32 in another point than along the radial axle of symmetry of the pad in order to obtain different effects of tilting and locking.

I claim:
1. In a disc brake:
a rotor having a pair of friction faces;
a torque-taking member mounted adjacent said rotor and having a pair of circumferentially spaced arms extending generally parallel to one of said friction faces, said arms defining opposite edges of a recess in said torque-taking member, and a web interconnecting said arms and defining the bottom edge of said recess;
each of said arms including projections extending into said recess, each of said projections carrying a bearing surface facing said web and cooperating with the latter and with the corresponding arm to define a generally V-shaped notch in each of said arms, said bearing surfaces defining the upper sides of their corresponding notches;
a friction element slidably mounted in said recess for movement toward and away from said one friction face, said friction element having extensions extending from opposite ends thereof, said extensions being received within said notches, said extensions having upper and lower sides, the upper sides of said extensions having bearing surfaces cooperating with the bearing surfaces on corresponding projections when a brake application is effected, the lower sides of each of said notches being cut away to define an opening between the lower side of the notch and the corresponding lower side of said extensions;

means for urging said friction element toward said one friction face when a brake application is effected;

unyielding support means carried by said web and by the lower edge of said friction element, to cooperate with the bearing surfaces to restrain said friction element on the opposite ends thereof and at the lower edge thereof whereby said friction element is supported at three points about the periphery thereof, said support means carried by said web supporting said friction element for rotation relative to the web; and resilient means yieldably urging the support means on the friction element into engagement with the support means on the web.

* * * * *